May 5, 1970
L. F. HIMMELMAN
3,510,622
GAS COOLED AND GAS SHIELDED ELECTRIC WELDING TORCH
Filed Sept. 20, 1967
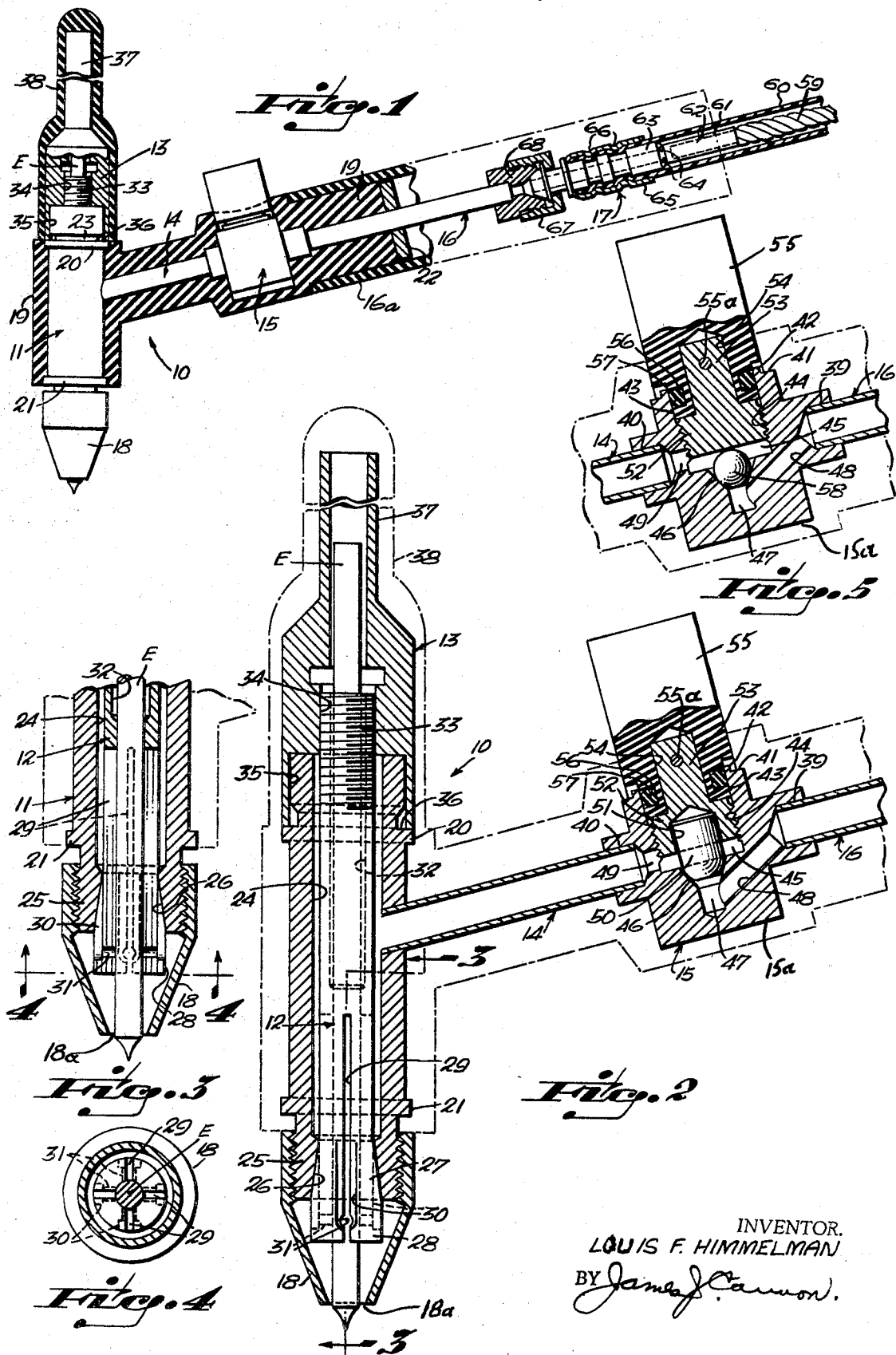
INVENTOR.
LOUIS F. HIMMELMAN
BY James J. Cannon
ATTORNEY.

United States Patent Office 3,510,622
Patented May 5, 1970

3,510,622
GAS COOLED AND GAS SHIELDED ELECTRIC WELDING TORCH
Louis F. Himmelman, 28 Arrowhead Drive, Upper Saddle River, N.J. 07458
Filed Sept. 20, 1967, Ser. No. 669,115
Int. Cl. B23k 9/16
U.S. Cl. 219—75                                     4 Claims

ABSTRACT OF THE DISCLOSURE

A gas-cooled, gas-shielded electric welding torch including a manually-actuated valve for controlling gas flow through the torch and including gas flow directing means in the electrode chuck and cooperative with a nozzle cap for effecting substantially columnar flow of the gas through an annular opening surrounding the electrode tip in the arc area.

---

In my Pat. No. 3,250,889 I describe a water-cooled, gas-shielded electric welding torch. The present invention relates to improvements in such electric torches with respect to the use of an inert gas for the cooling of the torch as well as for the shielding shroud or column of gas surrounding the arc flame during welding. It is, accordingly, the principal object of this invention to provide an electric welding torch of the character above described, including novel and improved manually-actuated valve means at the torch handle for controlling the flow of gas during welding operations.

A more particular object is to provide an electric welding torch of the above nature including improved gas flow and directing means along the electrode chuck and within the nozzle cap surrounding the electrode tip to provide columnar flow of the shielding gas about the tip during welding operations.

Other objects, features and advantages of the invention will be apparent from the following description when read with reference to the accompanying drawings. In the drawings, wherein like reference numerals denote corresponding parts throughout the several views:

FIG. 1 is a side elevational view of a welding torch embodying the invention, shown partly in section;

FIG. 2 is a side elevational view of the torch as in FIG. 1, but on an enlarged scale and in full cross-section to illustrate constructional details of the electrode chuck and gas valve control mechanisms;

FIG. 3 is a vertical cross-sectional view taken along the line 3—3 of FIG. 2 in the direction of the arrows and further illustrating constructional details of the electrode supporting and chucking mechanism;

FIG. 4 is a transverse cross-sectional view taken along the line 4—4 of FIG. 3 in the direction of the arrows; and FIG. 5 is a vertical cross-sectional view of a modified form of gas flow control valve forming part of the welding torch.

Referring now in detail to the drawings, the numeral 10 in FIG. 1 designates a preferred form of electric hand torch embodying my invention, the same being comprised, generally, of a cylindrical body portion or core 11, an electrode chuck 12, a chuck adjustment member 13, a first handle tube 14, a valve member 15, a second handle tube assembly 16, a nozzle cap 18, an insulating jacket 19 and a tubular handle grip member 16a. As hereinafter more particularly described, the hand torch 10 in use is connected to a gas-cooled electrical conduit member indicated generally by the reference numeral 17 in FIG. 1, which supplies electric current and cooling and arc-enveloping gas during the use of the torch under control of the valve member 15. The tubular hand grip member 16a, preferably of a hard synthetic plastic material, is force fitted over the outer end of the insulating jacket 19 and serves to encase and protect the connecting end of the electrical conduit member 17 as well as to provide a convenient handle for the torch. The friction fit of the tubular hand grip member 16a is such that it can be removed without difficulty when necessary for disconnecting the conduit member 17.

The torch body portion or core 11 which may be of brass, for example, is formed with upper and lower annular flanges 20, 21, respectively, and the second handle tube assembly 16 has secured, about midway along its length, a metal end disc 22, which disc, together with said flanges, provides shoulders against which end portions of the insulating jacket 19 seat. Preferably, the insulating jacket 19 is comprised of a material having a high dielectric strength as well as good heat insulating qualities, such as a phenolic material or a bonded silicone rubber. As best illustrated in FIG. 1, and as is hereinbelow more particularly described, the insulating jacket 19 encloses all of the gas-control valve 15 except its valve control knob 55.

The torch body portion or core 11 is formed near its upper end and adjacent the upper flange 20 with a reduced diameter or undercut portion 23 defining an annular shoulder 36. The core 11 is also formed with an axial bore 24 and an externally-threaded lower end portion 25. As illustrated at 26 in FIGS. 2 and 3, the lower end portion of the core 11 is formed with a tapered bore 26 of decreasing diameter from its outer to its inner end and terminating at its inner end and in communication with the lower end of the axial bore 24.

The electrode chuck 12 is tubular in form and, for the most part, of such outer diameter as to fit loosely within the axial bore 24 of the core 11. The lower end of the chuck 12 is integrally formed with a short section of gradually increasing outer diameter to provide an outwardly-divergent frusto-conical tip portion 27, the outer end of which extends into a short, cylindrical, terminal end portion 28. The taper of the lower end bore 26 of the core 11 matches the gradient angle of the frusto-conical tip portion 27 of the electrode tip portion 27; and said tip portion is normally in face-to-face, sliding engagement with respect to said frusto-conical tip portion. The lower end of the tubular chuck 12 is longitudinally slotted at four equidistantly-spaced portions about the periphery thereof, as indicated at 29, to provide resilient segmental gripping jaws; and the internal diameter of said tubular chuck at said lower end is stepped to provide a slightly-reduced diameter portion for gripping engagement with electrode rods upon closure of the chuck, as is hereinafter more particularly described.

As illustrated in FIGS. 2, 3 and 4, the slots 29 along the outside thereof along regions defined by the length of the frusto-conical portion 27 and a portion of the cylindrical outer end portion 28 of the chuck 12 and extending somewhat short of the outer end thereof are milled to provide slot portions 30 of increased width, in register with and in communication with respective ones of the slots 29. In addition, the slots 29 are cross-drilled at positions just short of the lower end of their respectively milled slots 20 as indicated at 31. It will be noted that the diameter of the cross-drilled bores 31 is lesser than the width of the milled slots 30.

The numeral 32 in FIGS. 2 and 3 designates the increased diameter portion of the internal bore at the upper end of the electrode chuck 12 through which an electrode rod E freely extends for chucking in the torch, as hereinafter more particularly described. As best illustrated in FIG. 2, the means for chucking an electrode E in place comprises external threads 33 at the upper end of the electrode chuck 12 cooperatively engaged with the internally-threaded bore 34 in the lower end of the tubular chuck adjustment member 13. As illustrated in FIG. 2, the chuck adjustment member 13 is integrally formed with an outwardly-extending cylindrical skirt portion 35 of increased internal diameter, as indicated at 35, and of such size as to fit slidingly over the outer end of the core 11 and in seating engagement thereagainst and against the shoulder 36 at the upper end of the core upper flange 20. The upper end 37 of the chuck adjustment member 13 is of reduced diameter to serve as a sleeve enclosing the upper end of a length of electrode E chucked in the torch and, as such, need only be long enough to accommodate the particular length of electrode rod being used. The chuck adjustment member 13 is provided with a removable cap member 38 of silicone rubber, for example, which can readily be fitted over said adjustment member after chucking adjustment is completed, thereby insulating the upper end of the torch and, at the same time, sealing off the open end of said adjustment member.

The nozzle cap 18, which is preferably of a ceramic material to withstand the heat generated at the welding tip, is threadable on the externally-threaded end 25 of the core 11, and directs gas flowing through tube 14, axial bore 24, jaw slots 29 and 30 and bores 31 to a narrow annular opening 18a near the arc-forming welding tip, whereby said tip will be encompassed by a columnar or tubular stream of gas to ensure that the arc will be always operating in a gas bubble.

Means is provided for cooling the flexible, hollow current conductor 59 electrically connected to the torch body or core 11 through first and second handle tubes 14 and 16, respectively and valve member 15. To this end, the flexible, hollow current conductor 59 is sleeved in flexible tubing 60, such as vinyl tubing, and has its torch terminal end soldered or otherwise secured in one end 61 of a tubular fitting 62, the other end 63 of which is of increased diameter and tubular, and formed with apertures 64 at its juncture end for the passage of gas. A ferrule 65 serves to crimp the end of the tubing 60 in annular recesses 66 formed about the outside of the fitting 67 receivable on a threaded stud member 68 soldered or otherwise secured to the outer end of the gas conduit tube 16. It will thus be apparent that not only is electrical contact made through the conductor 59 to the torch electrode E, but also said conductor, which carries a heavy current and, therefore, because of its limited diameter, must dissipate substantial quantities of heat, is continuously cooled by the gas flowing to the torch body through tubes 14 and 16 and valve member 15.

The thumb-actuated gas control valve 15 comprises a valve body member 15a, which is preferably machined of brass stock and formed at each end with co-axial inlet and outlet ports 39 and 40, respectively. The top of the valve body member 15 is milled to provide a flat annular seat portion 41 integrally formed with a concentric, upwardly-extending, reduced diameter lip portion 42. The upper end of the valve body member 15a is bored to provide a cylindrical recess 43 concentric with and of slightly lesser diameter than that of the reduced-diameter lip portion 42. The lower end of the cylindrical recess 43 extends to a depth of about one-fifth of the height of the valve body member 15a, and communicates at its lower end with a co-axial, internally-threaded bore 44 of slightly lesser diameter, the lower end of which terminates in communication with a comparatively short, concentric, underportion or recess 45. The recess 45 is approximately centrally located between the upper and lower ends of the valve body member 15a and communicates at its lower end with a co-axial, frusto-conical recess 46, the inner or lower end of which extends into and communicates with a short, blind, reduced-diameter bore 47. An oblique bored passageway 48 communicates between the short, blind bore 47 and the inlet port 39. The outlet port 40 communicates with the valve body recess 45 through a short transverse bore 49. Seated within the frusto-conical valve seat recess 46, as is illustrated in FIG. 2, is the spheroidal lower end portion of a cylindrical valve head member 50, the upper end of said valve head member being received within a blind bore 51 provided in the lower end of a cylindrical valve end member 52, said valve member being externally threaded at its lower end for screw-in fit with respect to the threaded bore 44 of the valve body member 15a, and being formed with a reduced diameter upper end portion 53 received within the lower end bore 54 of a cylindrical valve knob 55 of nylon or the like insulating material and secured thereto as by a transverse taper pin 55a. As means for sealing the upper end of the valve body member 15a against gas leakage, the valve knob 55 is provided near its lower end with a reduced-diameter portion receivable within the cylindrical recess 43 of said valve body member and having an annular recess 56 seated within which is a resilient O-ring 57 serving as a vertically-adjustable gasket. In FIG. 2, the valve member 15 is illustrated in closed or shut-off condition, the valve head member 50 being held seated in place in its valve seat defined by the frusto-conical recess 46 by virtue of the valve knob 55 being turned down to its lowermost position. It will be understood that to start the flow of gas through the first handle or gas tube 14 it is only necessary that the knob 55 be turned in the outward or release direction whereupon the pressure of gas exerted at the underside of the valve head 56 will raise it to the extent permitted by its now-raised associated valve end member 52 to permit the flow of gas around said valve head member, through the port bore 49 and into said gas tube. As described above, the gas will then flow through the axial lower ends of the slots 30 and thereupon being deflected outwardly at right angles. This change in direction of flow of a substantial portion of the gas will cause it to strike the inner diameter of the ceramic nozzle cap 18, creating a dispersion and mixing with the jet stream of gas emerging from the source slots 29 and thereby creating a substantially columnar outflow of tip-insulating inert gas at the annular orifice 18a.

FIG. 5 illustrates a modification of the valve 15 differing from that of FIG. 2 described above only in that instead of using a cylindrical valve head member 50 having a spheroidal end, a spherical or ball-shaped head member 58 is used. Preferably, the valve head members 50 and 58 are made of a tough synthetic plastic material such as Teflon.

It will be understood that while the welding torch herein disclosed, because of its small size, flexibility and adjustability, is especially well-suited to manual use, it could as well be adapted to use in automatic or semi-automatic machines in quantity production techniques.

While I have illustrated and described herein only two forms in which the invention may ocnveniently be embodied in practice. it is to be understood that these forms are presented by way of example and not in a limiting sense. The invention, in brief, comprises all the embodiments and modifications coming within the scope and spirit of the following claims.

What I claim as new and desire to secure by Letters Patent is:

1. An electric welding torch for high frequency current comprising, in combination, a torch body having an end-to-end bore, an annular chamber within said body and surrounding said bore, one end of said bore being recessed to provide a bore portion of gradually increasing diameter, a tubular chuck member received in said bore and having at one end an enlarged portion the outer surface of which is in face-to-face contact with said recessed portion of said bore, said chuck member having a plurality of circumferentially-spaced longitudinal slots at said one end and defining a plurality of laterally-resilient chuck jaws, means at the other end of said chuch member for drawing said one end thereof inwardly of said bore for actuating said chuck jaws including a welding electrode therein, and conduit means for circulating an inert coolant and arc-shielding gas through said chamber, transverse gas flow control means including insulation encapsulation means to protect the operator from high frequency arcing for said control means to control a coolant gas in said conduit means, said gas flow control means including a shut-off valve comprising a valve body member, a valve seat in said body member, a cylindrical valve head member having a spheroidal end portion seatable in sealing relation against said valve seat, a valve control knob adjustable with respect to said valve body member and operative to move said valve head member into and out of sealing relation, selectively, with respect to said valve seat, and a vertically adjustable gasket encircling the valve head member for sealing the upper end of the valve body member against gas leakage, said slots of said tubular chuck member, where extending through said recessed portion at said one end thereof, being of increased width at radially-outwardly-extending end portions thereof terminating short of the outer limits of said one end, a hollow nozzle cap attached to said torch body and having a nozzle tip defining an annular opening surrounding the tip end of an electrode supported in said chuck member, said increased width portions of said chuck member slots defining passageways blind at their outer ends, diverting portions of the gas outwardly against the surrounding inner wall portions of said nozzle cap to create sufficient gas dispersion within said nozzle cap to effect substantially complete columnar gas flow through said annular opening to concentrate arcing of welding energy at substantially the tip of said welding electrode.

2. An electrode welding torch as defined in claim 1 wherein said coolant and arc-shielding gas circulating means comprises a tubular handle fixed with respect to said torch body and extending outwardly of one side thereof.

3. An electrode welding torch as defined in claim 2 and including a hollow, flexible electrical conductor connected to said torch body through the outer end of said handle, said conductor being operative to carry inert gas from a source under pressure into communication with said handle passageway.

4. The electrode welding torch as defined in claim 1 wherein the said valve head member is in the form of a spherical ball.

References Cited

UNITED STATES PATENTS

| 2,310,164 | 2/1943  | Prendergast et al. | 219—75 |
| 2,376,265 | 5/1945  | Meredith           | 219—75 |
| 3,061,709 | 10/1962 | Hill               | 219—75 |
| 3,238,350 | 3/1966  | Klasson et al.     | 219—75 |
| 3,250,889 | 5/1966  | Himmelman          | 219—75 |
| 3,263,055 | 7/1966  | Broderick et al.   | 219—75 |
| 3,413,436 | 11/1968 | Tallman            | 219—75 |

JOSEPH V. TRUHE, Primary Examiner

W. D. BROOKS, Assistant Examiner